Oct. 20, 1964 C. L. KAMINSKI ETAL 3,153,721

MISSING FEED HOLE CIRCUIT

Filed July 28, 1960 4 Sheets-Sheet 1

INVENTOR
Craig L. Kaminski
Frank I. Gewickey, Jr.
BY Geoffrey Knight
ATTORNEY

MISSING FEED HOLE CIRCUIT

Filed July 28, 1960 4 Sheets-Sheet 2

MISSING FEED HOLE CIRCUIT

United States Patent Office 3,153,721

Patented Oct. 20, 1964

3,153,721

MISSING FEED HOLE CIRCUIT

Craig L. Kaminski, Mountain View Drive, Pleasant Valley, N.Y., and Frank I. Gewickey, Jr., Lake Road, Fishkill, N.Y.

Filed July 28, 1960, Ser. No. 92,112
4 Claims. (Cl. 235—61.11)

This invention relates to paper tape readers and more particularly to a circuit to control the processing of paper tape having missing or imperfect feed holes.

Paper tapes are widely used to record data for further use because of their economy and convenience in handling. The tape may be processed many times by low speed or high speed readers and may be stored indefinitely. It may be mailed or shipped to remote locations or may be read at one location and the data transmitted over telephone or telegraph lines to a reperforator station where the sending tape is duplicated. One of the principal advantages of coded paper tape over the other storage media is economy, and in keeping with this advantage the tape is generally prepared on inexpensive punches which do not always generate precisely punched holes in perfect registration.

Data are recorded in the form of encoded characters. The coding scheme used to represent the data may be arbitrarily chosen, but standard codes for data transmission and data processing are of five bits per character or eight bits per character. Each character manifestation occupies a row of punch positions arranged transversely across the tape, wherein each punch position represents a data bit. A feed hole or sprocket hole is generally positioned on a line of centers with the data holes. In such cases the feed hole becomes a convenient timing or positioning indicator for locating the data holes forming a particular character on the tape. Normally the gating of data into the read register is controlled by sensing the leading edge of the feed hole. It has been found however that the sharp precise timings required in high speed reading of paper tapes are not always obtainable from sensing the leading edge of the feed hole due to either missing feed holes or imperfectly punched feed holes. When the feed hole is not sensed, the data bits do not get into the read register and consequently the data are lost. It is desired therefore to provide means to insure that all the data bits are gated into the read register even when the feed hole is not sensed.

It is an object of this invention to provide a circuit to control the flow of information into a paper tape reader.

It is a further object of this invention to provide a circuit to control the flow of information into a paper tape reader when the tape has missing or imperfect feed holes.

It is a more specific object of this invention to provide a circuit which regulates the gate timing for reading information into a paper tape reader whether in response to a signal generated by sensing the feed hole or by a substitute signal generated from sensing the information data bits themselves when the feed hole is not sensed.

The foregoing and other objects, features and advantages of the invention will be apparent in the following more particular description of a preferred embodiment of the invention as illustrated in the accompanying drawings.

The invention is a mechanism for reading data recorded on a paper tape wherein successive characters taken from the tape are directed into a read register. The control of directing the data characters into the read register is ordinarily accomplished by a signal generated as a result of sensing the feed hole associated with that particular character. However, when the feed hole is not sensed, the data bits do not get into the read register, and consequently the data are lost. A circuit is provided which permits the controlling of the reading of information into the read register by a substitute signal. The substitute signal is generated for each data character by utilizing a pulse derived from sensing the leading edge of the data bits and combining this pulse with free running timing pulses to generate an output from a monostable device timed to fall after the normal feed hole sense time. If the feed hole has not been sensed by the fall of the output of the monostable device, the substitute signal is utilized to gate the data character into the read register and the feed hole sense signal is inhibited if it should arrive after this time.

*System.*—The paper tape reader includes a sensing station and a tape-transport mechanism, along with associated circuits to control the reading of information into a read register. The paper tape reader is generally disclosed in commonly assigned U.S. Patent 2,939,116, Burns et al., Tape Code Translator, filed April 2, 1956; and an application of Weiss and Benson, Serial Number 826,531, filed July 17, 1959. Burns et al. broadly discloses character acquisition program timings and their derivation from the feed hole associated with the paper tape character. The Weiss and Benson application discloses alternate methods of extracting master timings either from the data holes themselves or from the trailing edges of the feed holes if desired.

Figure 1:
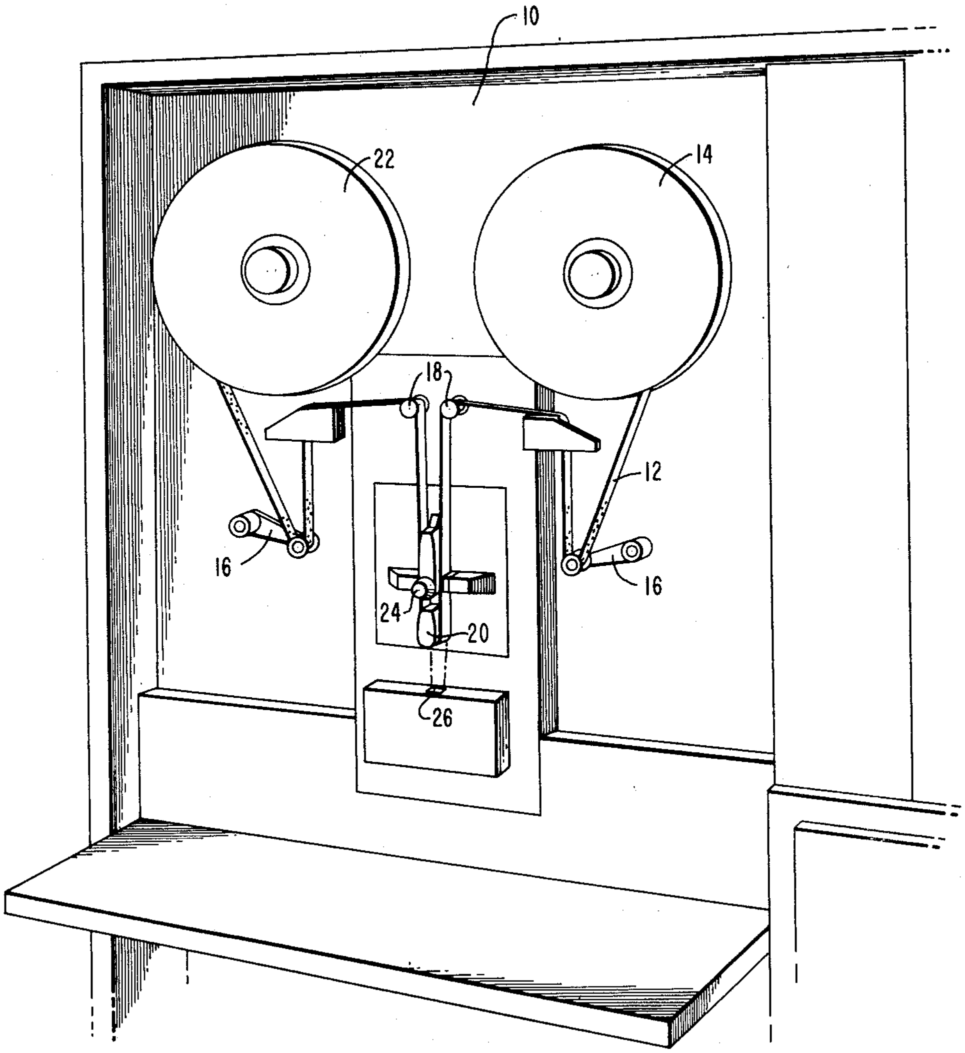
FIG. 1 is a front elevational view partly diagrammatic of the paper tape reader.

In the paper tape reader 10 (FIG. 1) paper tape 12 from a supply reel 14 is driven through a tensioning means 16 past an idler roller 18, the read head 20, another idler roller 18, and another tensioning means 16 to a takeup reel 22 by a tape feed mechanism 24. The tap feed mechanisms 24 is a pinwheel drive assembly for moving tape across the read head 20 at any suitable speed, such as 50 inches per second. The read head 20 comprises a housing with an opening (not shown) on its lower surface for each data channel and an additional one for the feed hole. Sensing means are arranged to sense data from the tape and present the data to the read register. The sensing means shown in FIG. 2 comprises photocells 28*a–h* and 31. In the embodiment shown, the photocells 28*a–h*, and 31 comprise photo diodes mounted in the read head 20 opposite the openings. The paper tape 12 is read by projecting a beam of light from light source 26 across the head 20 so that the beam of light covers the openings in the read head 20. The paper tape 12 blocks the light from all photo diodes opposite the portions of the tape 12 in which no data bit is punched so that an output occurs for each photo diode opposite a perforation in the tape. The supply reel 14, takeup reel 22, the tensioning means 16, and the idler rollers 18 may be of any type well known in the art, such as those described in the commonly assigned applications mentioned above, for example.

Figure 2:
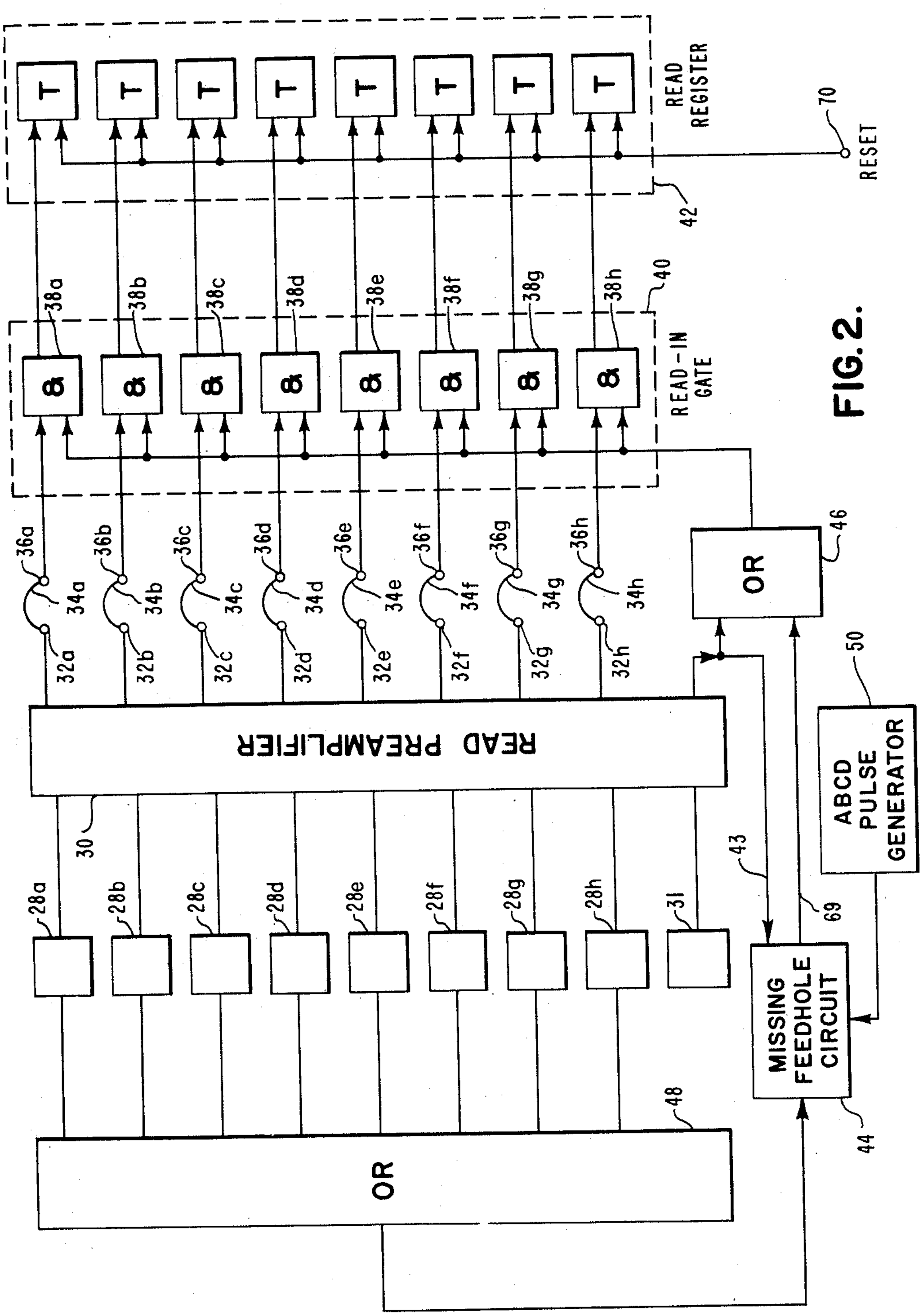
FIG. 2 is a block diagram illustrating data flow according to the invention for an eight channel system.

*Block diagram, data path.*—A simplified block diagram of the data path is shown in FIG. 2. An example of an eight channel paper tape reader is shown although any suitable number of channels may be used. The data bits of all eight paper tape channels and the feed hole are sensed photo electrically by means of photocells 28*a–h* and 31 respectively. The resulting data pulses are amplified in read preamplifiers 30, and the eight data channels are then connected directly to eight control panel output hubs 32*a* through 32*h*. Plugwires 34*a* through 34*h* connect to respective input hubs 36*a* through 36*h* to a read in gate 40. The plugwire connections may be altered to match various paper tape codes to the desired output code, but the usual eight channel paper tape code utilizes the direct connections as shown. The feed hole sense pulse is not directed to the control panel from the read preamplifiers, but is passed directly to the read register circuitry. Under normal operating conditions the feed hole sense pulse is passed through OR circuit 46 to condition the read in gate 40 so that the data character pulses will set a read register 42. Thus it is apparent that the data character pulses will not be gated into the read register when the feed hole is not sensed. To insure the gating of data into the read register, a missing feed hole circuit 44 is provided to generate a false feed hole sense pulse. The false feed hole sense pulse circuit is combined with the feed hole sense pulse circuit by OR circuit 46 so that the false feed hole sense pulses will condition the read in gate 40 and transfer the data character pulses into the read register. The outputs of the photocells 28*a* through 28*h* derived from sensing the leading edge of the data holes are fed into an eight way OR circuit 48 and the output of the eight way OR circuit 48 is fed to the missing feed hole circuit 44. This signal along with timing pulses from an ABCD pulse generator 50 starts the sequence of operation of the missing feed hole circuit which results in a false feed hole sense pulse when the feed hole is not sensed by a certain time as will be more fully described later. A 64 kc. oscillator (not shown) produces pulses which are gated to drive two ring triggers (not shown) which generate the ABCD pulses. The ABCD pulses occur in an uninterrupted chain of equally spaced pulses as shown on the timing diagram, FIG. 4, when the machine is in the normal operating condition.

Figure 3:
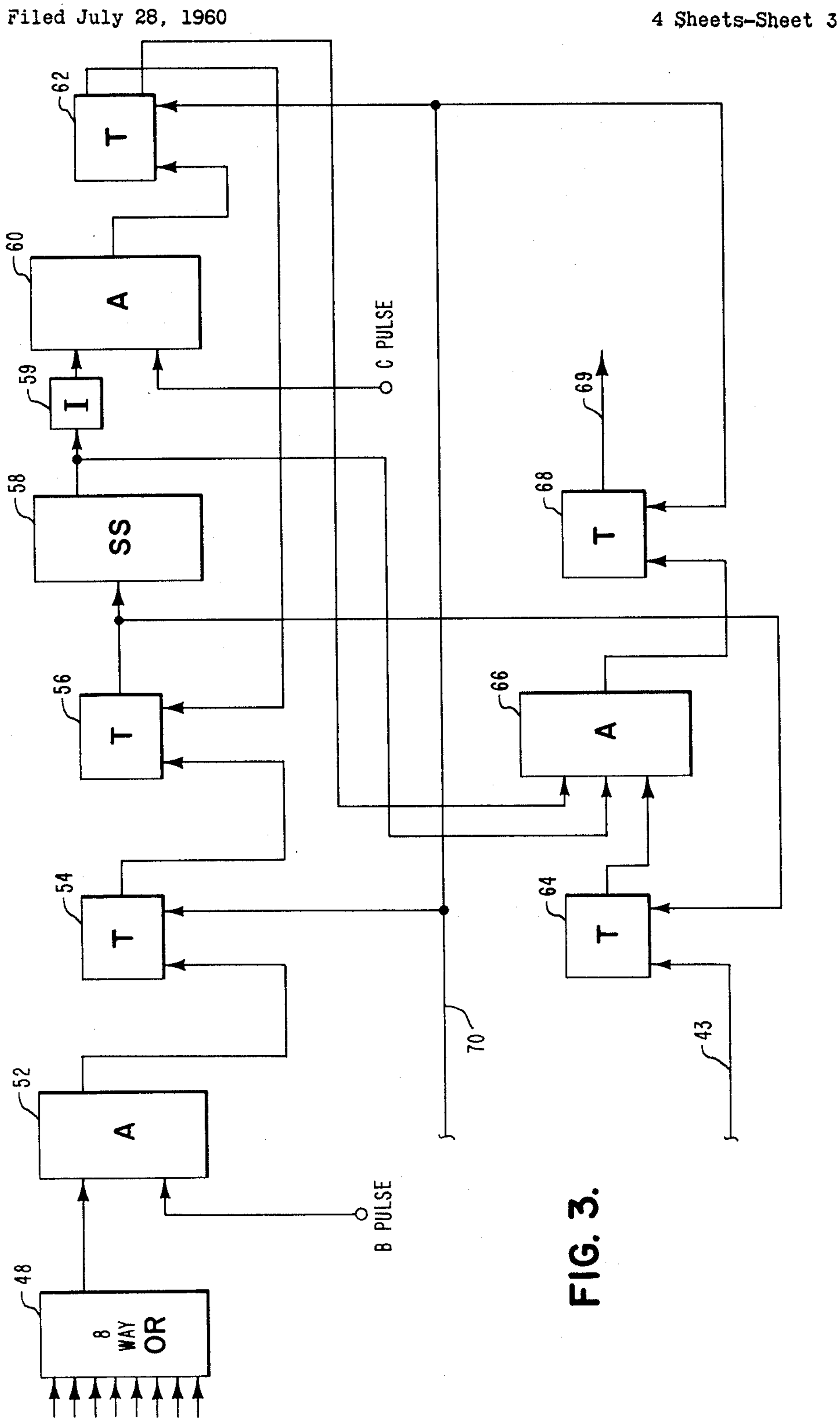
FIG. 3 is a block diagram of the missing feed hole circuit.

*Missing feed hole circuit, block diagram.*—A false feed hole sense signal, which is the output of trigger 68, is generated by a circuit shown in block diagram form in FIG. 3. The leading edge of the first data bit that is sensed produces an output from the corresponding photocell 28 which is fed into an eight way OR circuit 48. The output of the eight way OR circuit 48 is fed to AND circuit 52 and there combined with a B pulse to set trigger 54. The output of trigger 54 in turn sets trigger 56. The output of trigger 56 starts a single shot multivibrator 58 and is also used to turn off trigger 64 to insure that trigger 64 is reset for each data character. The output of the single shot multivibrator is fed to an AND circuit 60 through an inverter 59 where it is combined with the next C pulse to set trigger 62. The output of trigger 62 resets trigger 56 and also is connected to one of the inputs to a three way AND circuit 66. The single shot multivibrator output is connected to a second input to the three way AND circuit 66 and the output of trigger 64 forms the third input to the three way AND circuit 66. The reset output of trigger 64 partially conditions the three way AND circuit 66 and, when the trigger 64 is turned on by the feed hole sense pulse on line 43, the output deconditions the three way AND circuit 66 thereby inhibiting the generation of the false feed hole sense pulse when the feed hole has been sensed. The output of the three way AND circuit 66 sets trigger 68 and the output of trigger 68 supplies a gate pulse to substitute for the feed hole sense signal.

Figure 4:
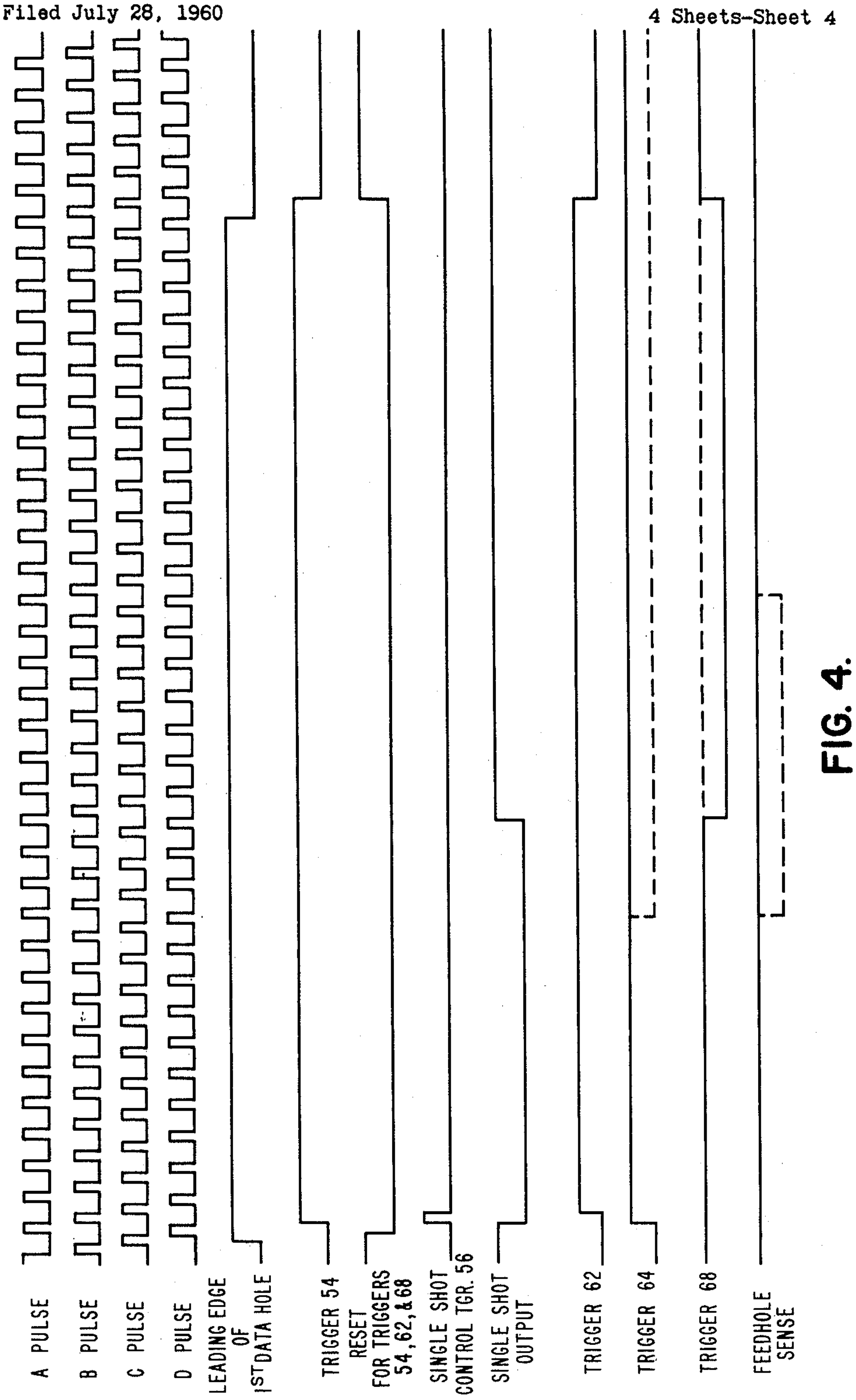
FIG. 4 is a timing diagram.

*Operation and timing diagram.*—Timing relationships are shown in FIG. 4 which is a plot of idealized wave form on a time scale. The wave forms shown by the dotted lines depict the operation of the circuit when the feed hole is sensed, whereas the wave forms shown by the solid lines depict the operation of the circuit when a false feed hole sense signal is required.

When the machine has been started, carried through beginning of record status, and into the normal operational status, the data is sensed and then gated into the read register 42 under control of a signal generated from the sensing of the associated feed hole. To insure that the information will be read into the read register 42 even when the feed hole is not sensed, the false feed hole generation cycle is started for each character by a signal generated upon sensing the leading edge of the first data hole. This signal is combined with the next B pulse in an AND circuit 52 to set a trigger 54. The output of this trigger 54 sets the single shot multivibrator control trigger 56 the output pulse of which starts the single shot multivibrator 58. The trailing edge of the single shot multivibrator output is timed to occur slightly after the normal sense time of the leading edge of the feed hole. The generation of the false feed hole signal depends on the presence of three input pulses to an AND circuit 66—one input pulse from trigger 62, another input pulse from the single shot multivibrator 58 and the third input from the reset condition of trigger 64 which is turned on by the feed hole sense signal. Thus, it can be seen that, unless the feed hole has been sensed by the time the three input pulses to AND circuit 66 are present, the false feed hole signal generation circuit will supply a false feed hole sense signal to line 69 which is then used to gate the data information into the read register 42.

In case the feed hole is sensed at the normal time, the feed hole trigger 64 will be on before the trailing edge of the single shot multivibrator output, and consequently the false feed hole sense signal generation will be inhibited. The feed hole sense signal may be inhibited in circuitry not shown by the output of trigger 68 if the feed hole sense signal arrives after the three inputs to AND circuit 66 have conditioned the AND circuit and produced the false feed hole sense signal. A signal generated by sensing the trailing edge of the data bits is combined with the next D pulse in an OR circuit (not shown) to generate a reset pulse which is fed over line 70 to reset triggers 54, 56, 68.

While the invention has been particularly shown and described with reference to a preferred embodiment thereof, it will be understood by those skilled in the art that various changes in form and details may be made therein without departing from the spirit and scope of the invention.

We claim:

1. A circuit for processing characters of data from punched paper tape through a record scanning machine comprising data hole sensing means; feed hole sensing means; register means for accepting data hole information; means responsive to said feed hole sensing means to gate said data hole information into said register; leading edge means responsive to said data hole sensing means for recognizing the leading edge of each data hole; means responsive to said leading edge means for generating an output signal therefrom; means responsive to said output signal controlling said gating means to control the flow of data to said register; and means responsive to said feed hole sensing means to inhibit said means responsive to said output signal when the feed hole is sensed.

2. A high speed reader for punched paper tape comprising data hole sensing means; feed hole sensing means for generating a feed hole sense signal; a read register for accepting data hole information; means controlled by said feed hole sense signal for gating data hole information into said read register; means for sensing the leading edge of said data holes; means responsive to said leading edge sensing means to generate a timed output signal; means controlled by said output signal for generating a false feed hole sense signal; means controlled by said false feed hole sense signal to control said gating means for reading data hole information into said read register; and means controlled by said feed hole sensing means to inhibit said false feed hole sense signal when the feed hole is sensed.

3. An apparatus for reading coded combinations forming data characters from a punched paper tape comprising data hole sensing means; feed hole sensing means; register means for accepting data hole information; means responsive to said feed hole sensing means to gate said data hole information into said register at a first time; leading edge means responsive to said data hole sensing means for recognizing the leading edge of each data hole; a monostable device responsive to said leading edge means for generating an output signal timed to fall at a second time; means responsive to said output signal controlling said gating means to gate said data hole information into said register at said second time; and means responsive to said feed hole sensing means for inhibiting the means responsive to said output signal when the feed hole is sensed prior to said second time.

4. In a high speed paper tape reader the combination comprising: means to sense data holes; means to sense a feed hole; a read register; means responsive to said feed hole sensing means to gate said data into said read register; leading edge means responsive to said data hole sensing means for recognizing the leading edge of the first data hole sensed; delay means operably responsive to said leading edge means for generating a first output signal timed to fall at a predetermined time; indicating means adapted to be turned on in response to said leading edge means to generate a second output signal; means controlled by said feed hole sense means for turning off said indicating means; and means controlling said gating means to gate said data into said read register at said predetermined time upon the coincident conditioning of two inputs, said two inputs being said first and said second output signals.

No references cited.

UNITED STATES PATENT OFFICE

CERTIFICATE OF CORRECTION

Patent No. 3,153,721 October 20, 1964

Craig L. Kaminski et al.

It is hereby certified that error appears in the above numbered patent requiring correction and that the said Letters Patent should read as corrected below.

In the grant, line 2, after "Fishkill, New York," insert -- assignors to International Business Machines Corporation, of New York, N. Y., a corporation of New York, --; line 11, for "Craig L. Kaminski and Frank I. Gewickey, Jr., their heirs" read -- International Business Machines Corporation, its successors --; in the heading to the printed specification, lines 3 to 5, for "Craig L. Kaminski, Mountain View Drive, Pleasant Valley, N. Y., and Frank I. Gewickey, Jr., Lake Road, Fishkill, N. Y." read -- Craig L. Kaminski, Pleasant Valley, N. Y., and Frank I. Gewickey, Jr., Fishkill, N. Y., assignors to International Business Machines Corporation, New York, N. Y., a corporation of New York --; column 2, line 44, for "tap" read -- tape --.

Signed and sealed this 23rd day of March 1965.

(SEAL)
Attest:

ERNEST W. SWIDER
Attesting Officer

EDWARD J. BRENNER
Commissioner of Patents